United States Patent
Yabe et al.

(10) Patent No.: US 8,814,412 B2
(45) Date of Patent: Aug. 26, 2014

(54) AREA LIGHT SOURCE DEVICE

(75) Inventors: Mamoru Yabe, Sakado (JP); Koichi Takemura, Konan (JP); Kazuhide Hirota, Moriyama (JP); Chih Bun Shiu, Hong Kong (CN)

(73) Assignee: OMRON Corporation, Kyoto (JP)

( * ) Notice: Subject to any disclaimer, the term of this patent is extended or adjusted under 35 U.S.C. 154(b) by 376 days.

(21) Appl. No.: 13/057,300

(22) PCT Filed: Aug. 7, 2009

(86) PCT No.: PCT/JP2009/064018
§ 371 (c)(1),
(2), (4) Date: Apr. 28, 2011

(87) PCT Pub. No.: WO2010/016571
PCT Pub. Date: Feb. 11, 2010

(65) Prior Publication Data
US 2012/0002441 A1    Jan. 5, 2012

(30) Foreign Application Priority Data
Aug. 7, 2008 (JP) ................. 2008-204525

(51) Int. Cl.
*F21V 7/04* (2006.01)
*G02F 1/1335* (2006.01)

(52) U.S. Cl.
CPC .............. *G02B 6/002* (2013.01); *G02B 6/0028* (2013.01); *G02B 6/0081* (2013.01); *G02B 6/0023* (2013.01); *G02B 6/0053* (2013.01); *G02F 1/133615* (2013.01); *G02B 6/0051* (2013.01)
USPC ............................ 362/608; 362/606; 362/607

(58) Field of Classification Search
USPC ........................................ 362/606, 607, 608
See application file for complete search history.

(56) References Cited

U.S. PATENT DOCUMENTS 7,083,318 B2    8/2006  Ha et al.
(Continued)

FOREIGN PATENT DOCUMENTS

CN        101226304 A      7/2008
(Continued)

OTHER PUBLICATIONS

Machine translation of JP 2006-236641.*
(Continued)

*Primary Examiner* — Anh Mai
*Assistant Examiner* — Zachary J Snyder
(74) *Attorney, Agent, or Firm* — Osha Liang LLP

(57) ABSTRACT

An area light source device has a diffusion plate and a prism sheet stacked on a light guide plate, and a light source disposed opposite an end face of the light guide plate. Light emitted from the light source is introduced to an inside of the light guide plate from the end face. Area light emission is obtained by outputting the light diffused in the light guide plate from the diffusion plate and the prism sheet through a front face disposed opposite the diffusion plate. The light guide plate includes a light guide section that includes the end face disposed opposite the light source, a light emitting section that is disposed opposite the diffusion plate, and a joining section that joins the light guide section and the light emitting section. The front surface in the joining section includes an inclined surface that is gradually retreated toward a rear surface on an opposite side from the light guide section toward the light emitting section. The front faces of the light guide section and the joining section are covered with a light shielding member. The light shielding member is fixed to the diffusion plate without interposing the prism sheet therebetween. The light shielding member and the inclined surface are arranged to allow air to be interposed therebetween.

18 Claims, 8 Drawing Sheets

(56) References Cited

U.S. PATENT DOCUMENTS

| | | | |
|---|---|---|---|
| 2007/0103910 A1* | 5/2007 | Brickey et al. | 362/311 |
| 2008/0031010 A1* | 2/2008 | Kim et al. | 362/612 |
| 2008/0043171 A1* | 2/2008 | Takahashi et al. | 349/65 |

FOREIGN PATENT DOCUMENTS

| | | | |
|---|---|---|---|
| JP | 6-317797 A | 11/1994 | |
| JP | 11-024074 A | 1/1999 | |
| JP | 2002-109926 A | 4/2002 | |
| JP | 3437029 B2 | 6/2003 | |
| JP | 2004-265797 A | 9/2004 | |
| JP | 2006-069045 A | 3/2006 | |
| JP | 2006-236641 A | 9/2006 | |
| JP | 2007-141596 A | 6/2007 | |
| JP | 2007-256697 A | 10/2007 | |
| JP | 2008/046430 A | 2/2008 | |
| JP | 2008-053009 A | 3/2008 | |
| JP | 2009-081014 A | 4/2009 | |
| TW | 200630706 | 10/1994 | |
| TW | 200905311 A | 2/2009 | |

OTHER PUBLICATIONS

Office Action for Korean Application No. 10-2011-7000984 dated Jan. 28, 2013, with English translation thereof (9 pages).

Office Action Issued in Chinese Application No. 200980128695.9, Dated: Oct. 31, 2012 (12 Pages with English Translation).

Office Action Issued in Taiwan Application No. 098126477, Dated: Oct. 15, 2012 (13 Pages with English Translation).

International Search Report issued in PCT/JP2009/064018, mailed on Sep. 1, 2009, with translation, 4 pages.

\* cited by examiner

AREA LIGHT SOURCE DEVICE

BACKGROUND OF THE INVENTION

1. Technical Field

The present invention relates to an area light source device that is used as a backlight device of a liquid crystal display device.

2. Background Art

An edge illuminated type area light source device is well known as the area light source device. The edge illuminated type area light source device includes an area light emitting section in which a diffusion plate and a prism sheet are stacked on a light guide plate and a light source that is disposed opposite an end face of the light guide plate. In the edge illuminated type area light source device, light emitted from the light source is introduced to the inside from the end face of the light guide plate, and the light diffused in the light guide plate is outputted from the diffusion plate and the prism sheet, thereby obtaining the area light emission.

For example, Patent Document 1 proposes an edge illuminated type area light source device in which a section shrinking portion whose thickness is decreased with distance from an incident end face is provided in an end portion of the light guide plate adjacent to the light source and the light incident from the end face is narrowed and propagated to an area light emitting region.

According to the technology disclosed in Patent Document 1, the thickness of the area light emitting region can be decreased in the area light source device to thin the liquid crystal display device. However, for part of the light emitted from the light source, an incident angle is decreased with respect to the inclined surface. As a result, part of the light leaks from the inclined surface. The leaking light is incident to the end face of the prism sheet or between the prism sheets, which generates uneven luminance in a liquid crystal panel (particularly, an edge portion near the light source).

Patent Document 2 proposes that ink is applied to the end face of the prism sheet. However, the even application of the ink to the end face of the extremely thin prism sheet (about 60 μm) significantly blocks quantity production of the prism sheet. Even if the ink can be applied to the prism sheet, reliability is extremely low, and it is not practical in consideration of the chip-off of the dried ink.

Patent Document 1: Japanese Unexamined Patent Publication No. 6-317797
Patent Document 2: Japanese Patent No. 3437029

SUMMARY

One or more embodiments of the present invention provides an area light source device (10) in which a diffusion plate (26) and a prism sheet (27) are stacked on a light guide plate (11), light emitted from a light source (23) disposed opposite an end face (14) of the light guide plate is introduced to an inside from the end face (14) of the light guide plate (11), and area light emission (35) is obtained by outputting the light diffused in the light guide plate (11) from the diffusion plate (26) and the prism sheet (27) through a front face (13) disposed opposite the diffusion plate (26), wherein the light guide plate (11) includes: a light guide section (16) that includes the end face (14) disposed opposite the light source (23); a light emitting section (21) that is disposed opposite the diffusion plate (26); and a joining section (19) that joins the light guide section (16) and the light emitting section (21), the front surface in the joining section (19) includes an inclined surface (20) that is gradually retreated toward a rear surface (12) on an opposite side from the light guide section (16) toward the light emitting section (21), the front faces of the light guide section (16) and the joining section (19) are covered with a light shielding member (32), the light shielding member (32) is fixed to the diffusion plate (26) without interposing the prism sheet (27) therebetween, and air can be interposed between the light shielding member (32) and the inclined surface (20).

According to the area light source device (10) according to one or more embodiments of the present invention, the light (36) leaking from the inclined surface (20) is shielded by the light shielding member (32). Because the end portion of the light shielding member (32) is fixed to the diffusion plate (26), the leaking light (36) is not propagated to the prism sheet (27). Therefore, the uneven luminance is not generated at the end of the light emitting section (21), but evenness of the area light emission (35) is maintained.

DESCRIPTION OF SYMBOLS

Figure 1:
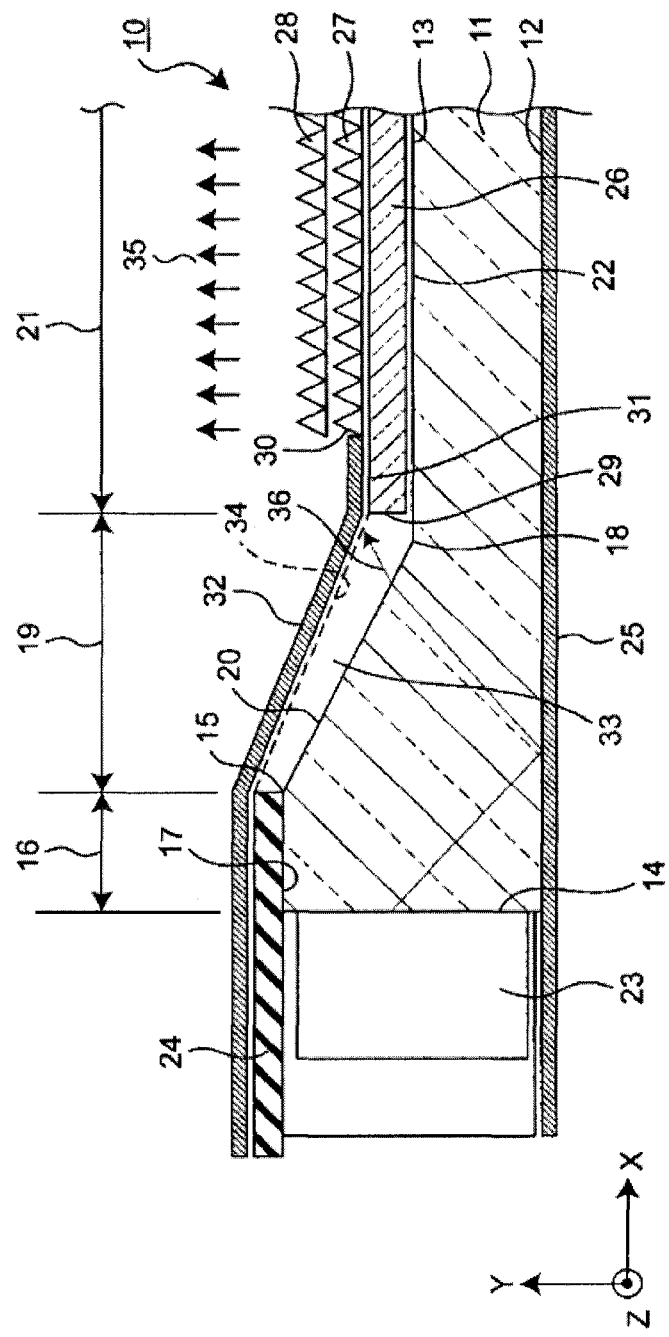
FIG. 1 is a partially enlarged sectional view of an area light source device according to a first embodiment of the present invention.

10: area light source device
11: light guide plate
12: rear surface
13: front surface
14: end face
15: first position (inclination beginning portion)
16: region (light guide section)
17: surface (circuit board support surface)
18: second position (inclination terminating portion)
19: region (joining portion, narrow-down section)
20: inclined surface
21: region (light emitting section)
22: surface (film support surface)
23: light source
24: circuit board
25: reflecting member
26: diffusion plate
27,28: prism sheet
29: diffusion plate end portion
30: prism sheet end portion 31: light shielding sheet fixed portion (light shielding member fixed portion)
32: light shielding sheet (light shielding member)
33: air layer
34: nonadhesive layer (bonding preventing layer)
35: area light emission
40: light shielding sheet end portion
41: spacer
42: liquid crystal panel
46: light shielding sheet end portion
50: radial prism structure
51: projection
52: cut
53: adhesive portion

DETAILED DESCRIPTION

Embodiments of the present invention will be described below with reference to the accompanying drawings. Terms, such as "up", "down", "right", "left", "front", and "back (rear)", which mean specific directions and other terms including the terms are used in the following description with reference to the drawings for the purpose of easy understanding of the present invention. However, the technical scope of the present invention is not restricted by the terms. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

FIG. 1 illustrates a part of an area light source device 10 according to a first embodiment of the present invention. The area light source device 10 of FIG. 1 includes a light guide plate 11. The light guide plate 11 has a rectangular or square quadrangle when viewed from a front side (upper side of FIG. 1). An outer shape of the light guide plate 11 is formed by a rear surface 12 located on a lower side of FIG. 1, a front surface 13 located an upper side of FIG. 1, and four end faces that join the 12 and the front surface 13.

Figure 7:
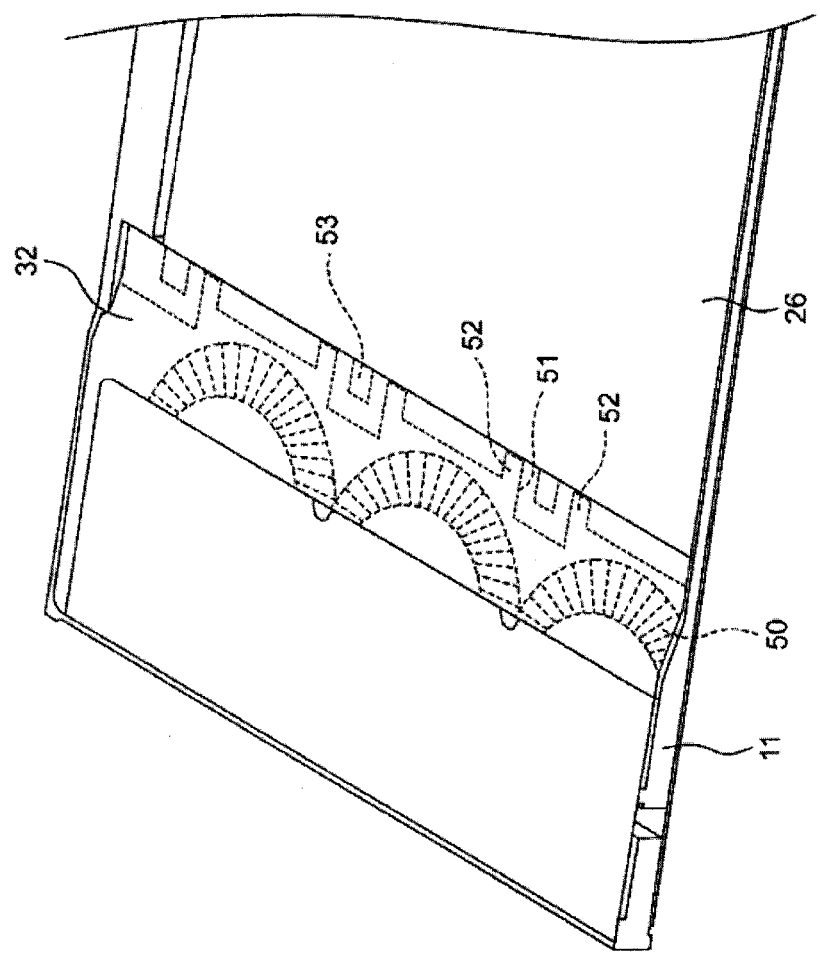
FIG. 7 is a partially perspective view of an area light source device according to a third embodiment of the present invention.

As illustrated in FIG. 1, a thickness (width in a vertical direction) of the light guide plate 11 is increased near an end face 14. Specifically, the rear surface 12 of the light guide plate 11 is formed by one flat surface. On the other hand, the front surface 13 of the light guide plate 11 is formed by a region 16, a region 19, and a region 21. The region 16 to a first position (inclination beginning portion) 15 away from the end face 14 by a predetermined distance is formed by a flat surface (circuit board support surface) 17. The region 19 to a second position (inclination terminating portion) 18 away from the first position 15 on the right side (opposite side to the end face 14) by a predetermined distance is formed by a surface (inclined surface) 20 that is inclined from the first position 15 toward the second position 18 such that the thickness of the light guide plate 11 is gradually decreased. The region 21 on the right from the second position 18 is formed by a flat surface (film support surface) 22. At this point, the inclined surface may two-dimensionally be formed as illustrated in FIG. 1, or the inclined surface may three-dimensionally be formed as illustrated in FIG. 7. A V-shape groove (see FIG. 7) or an irregular shape may be provided in the inclined surface in order that the light hardly leaks from the inclined surface. Hereinafter, in the light guide plate 11, the region 16 including a flat surface adjacent to the end face 14 is referred to as a light guide section, the region 21 including a flat surface away from the end face 14 is referred to as a light emitting section, and the inclined region 19 located between the light guide section 16 and the light emitting section 21 is referred to as a joining section (or narrow-down section).

A light source 23 is disposed opposite the end face 14. In the first embodiment, a light emitting diode is used as the light source 23, and a plurality of light emitting diodes are disposed in a surface-backside direction of the paper (Z-direction orthogonal to X- and Y-directions illustrated in the figure) of FIG. 1 at predetermined intervals. Preferably a circuit board 24 that electrically connects the light source 23 and a power supply (not illustrated) is fixed to the circuit board support surface 17 of the light guide section 16.

It is necessary that the end face 14 of the light guide plate 11 and the light source 23 be optically connected such that the light emitted from the light source 23 is efficiently incident to the inside of the light guide plate. Therefore, the thickness (a height in the Y-direction of the end face 14) of the light guide section 16 is required to some extent.

As described later, in the light incident to the light guide plate 11, the light leaking from the side of the rear surface 12 of the light guide plate is reused by a reflecting member 25. The reflecting member 25 may be formed by a single reflecting sheet, or the reflecting member may be formed by applying a reflecting material to the rear surface 12 of the light guide plate 11. Therefore, the incident light is efficiently outputted from the front surface 13.

A plurality of optical sheets are disposed on the film support surface 22 constituting the light emitting section 21. In the first embodiment, one diffusion plate 26 and one or two prism sheets 27 and 28 are disposed on the light guide plate 11. As illustrated in FIG. 1, the left end (a diffusion plate end portion 29 adjacent to the inclined surface 20) of the diffusion plate 26 is disposed near the inclination terminating portion 18. On the other hand, the left ends of the prism sheets 27 and 28 (an end portion 30 adjacent to the inclined surface 20) are deviated to the right side from the diffusion plate end portion 29, and a light shielding sheet adhesive portion (light shielding member fixed portion) 31 is formed by exposing a front surface portion near the end portion of the diffusion plate 26.

A light shielding sheet 32 is disposed on the inclined surface 20. The light shielding sheet 32 prevents the light leaking from the inclined surface 20 from entering the insides of the prism sheets 27 and 28 from the end faces of the prism sheets 27 and 28 and from between the prism sheets 27 and 28. At the end portion of the light guide plate 11, the light shielding sheet 32 is continuously disposed in the Z-direction along the end face 14 while the whole of the inclined surface 20 is covered with the light shielding sheet 32. One end side (left side) of the light shielding sheet 32 is fixed to the light guide section 16 with the circuit board 24 interposed therebetween, the other end side is fixed to the light shielding member fixed portion 31 of the diffusion plate 26.

Figure 2:
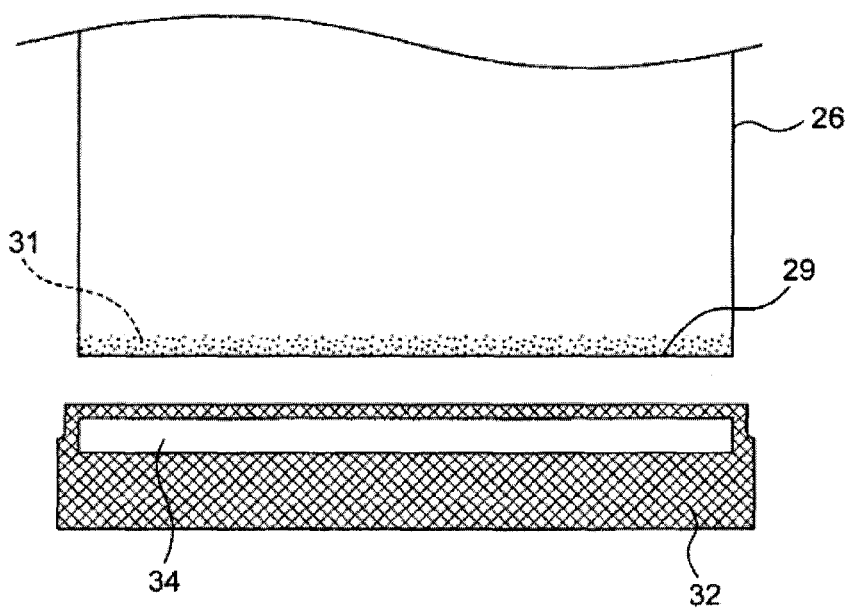
FIG. 2 is a plan view partially illustrating a light shielding sheet and a diffusion plate of the area light source device illustrated in FIG. 1.

Thus, the adhesive layer (not illustrated) is formed in the rear surface of the light shielding sheet 32 in order to fix the light shielding sheet 32 to the light guide section 16 and the diffusion plate 26. On the other hand, a nonadhesive layer 34 is formed in the portion (inclined surface cover portion) of the light shielding sheet 32, with which the inclined surface 20 is covered, such that close contact between the light shielding sheet 32 and the inclined surface 20 is prevented to form an air layer 33 between the light shielding sheet 32 and the inclined surface 20 (see FIG. 2). Preferably the nonadhesive layer 34 is formed by printing a nonadhesive material onto an adhesive layer. For example, Japanese Unexamined Patent Publication No. 2006-69045 discloses the printing technology. Alternatively, a nonadhesive film may adhere to the rear surface of the light shielding sheet 32 to form the nonadhesive layer. Preferably the light shielding sheet 32 has a color (for example, black) that is excellent to absorb the light for the original reason. Although according to one or more embodiments of the present invention, the nonadhesive layer 34 is in black, the nonadhesive layer may be formed by a color except black in order to be able to confirm the nonadhesive layer.

According to the area light source device 10, most light incident to the light guide plate 11 from the light source 23 is transmitted through the light guide section 16 and the joining section 19 while repeatedly reflected by the rear surface 12 and front surface 13 of the light guide plate 11, the light is propagated to the light emitting section 21 to expand in the light emitting section, and the light is outputted from the light emitting section 21. The light outputted from the light emitting section 21 is diffused by the diffusion plate 26, and the light is collected forward by the prism sheets 27 and 28 to evenly form area light emission 35 on the light emitting section 21.

Thus, while most light incident to the light guide plate 11 forms the area light emission 35, part of the light incident to the inclined surface 20 is transmitted through the inclined surface 20 to leak to the outside. However, the light leaking from the inclined surface 20 is caught by the light shielding sheet 32. Because the right end portion of the light shielding sheet 32 adheres rigidly to the diffusion plate 26, the leaking light 36 is not propagated to the prism sheets 27 and 28. Therefore, the uneven luminance is not generated at the end of the light emitting section 21, but the evenness of the area light emission 35 is maintained.

Table 1 illustrates examples of specific materials (products) used in the members constituting the area light source device 10.

TABLE 1

| Member | Material/Product name |
| --- | --- |
| Light source | Product of Nichia Corporation, NSSW006 (thickness: 0.6 mm) |
| Light guide plate | Polycarbonate (thickness: light guide section 0.5 mm, light emitting section 0.3 mm) |
| Reflecting member | Product of 3M, ESR, (thickness: 0.065 mm) |
| Diffusion plate | Product of Tsujiden Co., Ltd., D122 (thickness: 0.043 mm) |
| Prism sheet | Product of 3M, TBEF (thickness: 0.065 mm stacked in pairs) |
| Light shielding sheet | Product of Teraoka Seisakusyo Co., Ltd., 707306 (thickness: 0.06 mm) Product of Nitto Denko Corporation, AS-020PB11N (thickness: 0.03 mm) |

Figure 3:
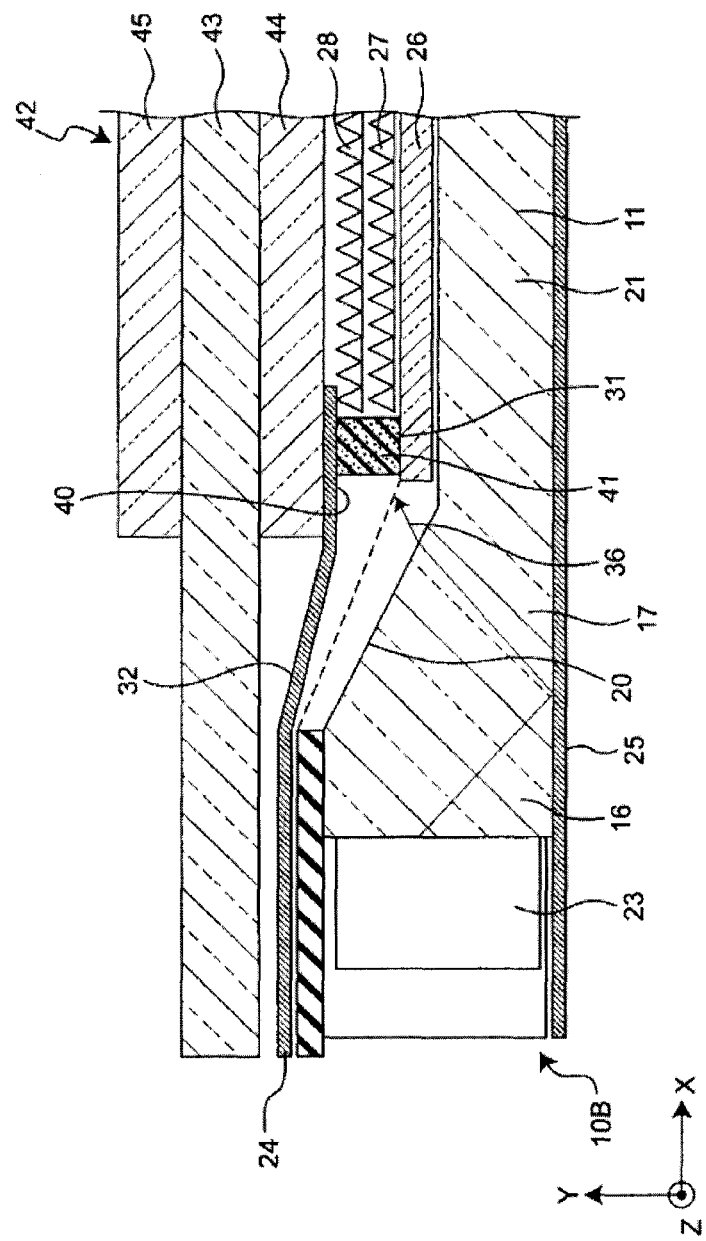
FIG. 3 is a partially enlarged sectional view illustrating an area light source device according to a modification of the first embodiment.

FIG. 3 illustrates an area light source device 10B according to a modification of the first embodiment. As illustrated in FIG. 3, in the area light source device 10B, a light shielding spacer 41 is interposed between the end portion 40 of the light shielding sheet 32 and the light shielding sheet fixed portion 31 of the diffusion plate 26. The light shielding sheet fixed portion is disposed opposite the end portion of the light shielding sheet. "Thin Clean Form SCF400" (product of Nitto Denko Corporation) can be cited as an example of a specific material of the spacer 41. Preferably the light shielding spacer 41 is continuously or partially fixed to the light shielding sheet 32 and the diffusion plate 26 by, for example, a double-sided adhesive tape (not illustrated). In the light shielding spacer 41, as illustrated in FIG. 3, while a liquid crystal panel 42 (including a liquid crystal glass 43 and polarization plates 44 and 45) are placed on the area light source device 10B as illustrated in FIG. 3, according to one or more embodiments of the present invention, the front surface of the light shielding spacer 41 and the front surface of the prism sheet 28 are flush or substantially flush with each other, that is, the front surfaces of the light shielding spacer and the prism sheet are located on one flat surface. Therefore, according to one or more embodiments of the present invention, the light shielding spacer 41 is made of a foamed resin having flexibility and compressive performance in addition to a light shielding property.

According to the area light source device 10B according to one or more embodiments of the present invention, the light 36 leaking from the inclined surface 20 can securely be prevented from invading in the prism sheets 27 and 28. Because the light shielding sheet 32 is pressed against the light shielding spacer 41 by the liquid crystal panel 42 (particularly the polarization plate 44) while the liquid crystal panel 42 and the area light source device 10B are combined, the light shielding spacer 41 does not float from the diffusion plate 26, and the diffusion plate 26 does not float from the front surface 13 of the light guide plate 11.

Second Embodiment

Figure 4:
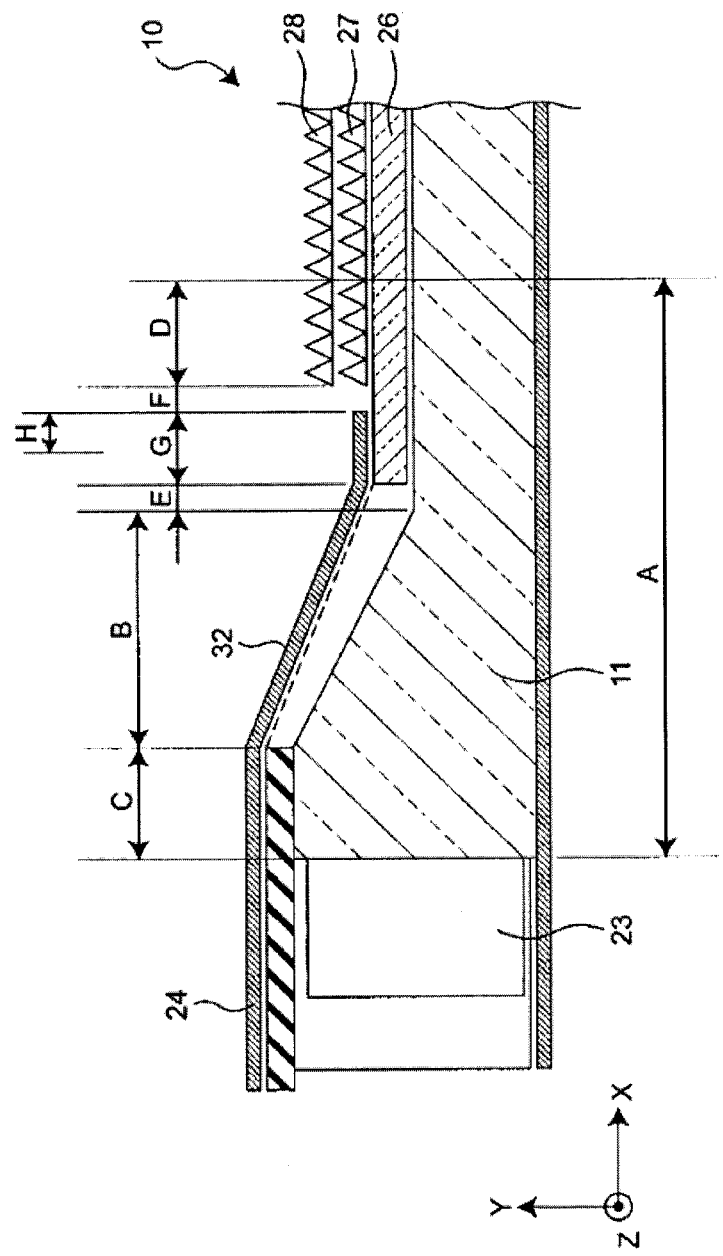
FIG. 4 is a view for explaining a dimensional relationship among portions of the area light source device.

Table 2 illustrates an example of dimensions of a configuration disposed in the end portion of the area light source device and the reason the dimensions are restricted (see FIG. 4).

TABLE 2

| Region | Dimensions (restriction reason) |
| --- | --- |
| A: end portion dead space | 5 mm (depends on final product) |
| B: inclined surface | 2 mm (cannot be shortened due to use efficiency of light) |
| C: circuit board support surface | 1 mm (fixing defect is possibly generated when shortened) |
| D: light emitting surface margin portion | 0.5 mm (edge of prism sheet should be hidden when obliquely viewed) |
| E, F: clearance | 0.2 mm (required due to forming accuracy of sheet) |

As is clear from Table 2 and FIG. 4, the light shielding sheet 32 has a fixed width G of 1.1 mm. A substantial value H of the fixed width G falls within a ranges of 0.7 mm±0.4 mm in consideration of a printing tolerance (±0.4 mm) of the nonadhesive agent of the light shielding sheet and a forming tolerance of each member. Therefore, various advises are made in the second embodiment in the following description.

Figure 5:
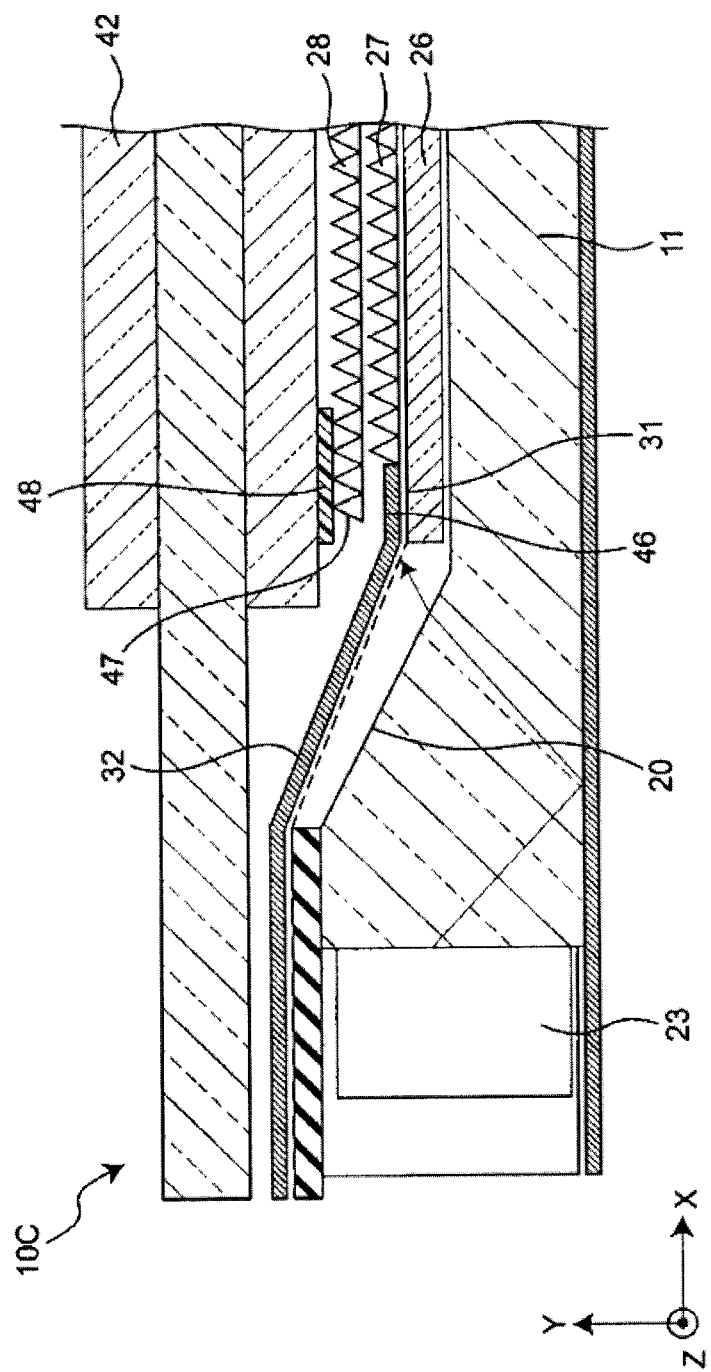
FIG. 5 is a partially enlarged sectional view of an area light source device according to a second embodiment of the present invention.
Figure 6:
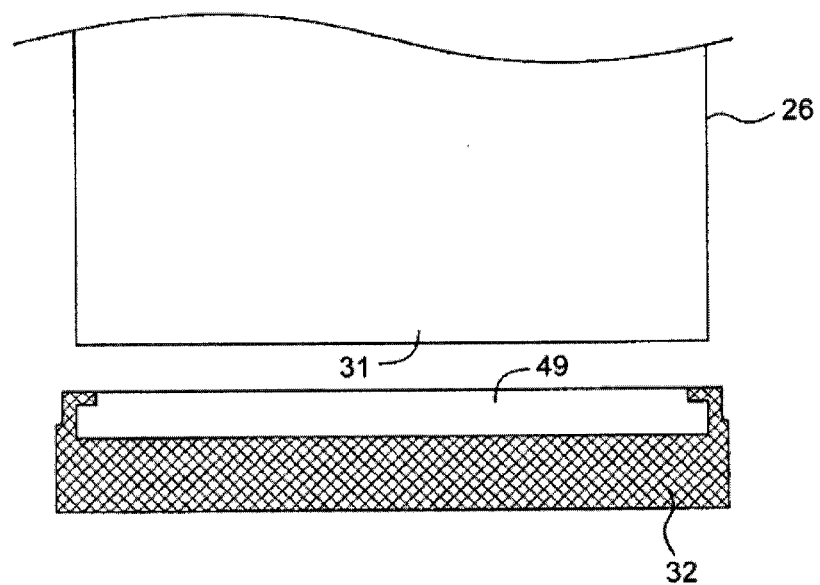
FIG. 6 is a plan view partially illustrating a light shielding sheet and a diffusion plate of the area light source device illustrated in FIG. 5.

Specifically, referring to FIG. 5, in an area light source device 10C of the second embodiment, an end portion 47 of the second prism sheet 28 is disposed on a light shielding sheet end portion 46. The light shielding sheet end portion 46 is disposed on the light shielding sheet fixed portion 31. Another light shielding sheet 48 is disposed on the end portion 47 of the second prism sheet 28. As illustrated in FIG. 6, a nonadhesive layer 49 is formed in a portion of the under-layer light shielding sheet 32. The portion of the light shielding sheet 32 is disposed opposite the light shielding sheet fixed portion 31. Accordingly, only the under-layer light shielding sheet 32 is disposed while overlapping the light shielding sheet fixed portion 31. On the other hand, adhesive layers are formed on both surfaces of the upper-layer light shielding sheet 48, and the light shielding sheet 48 is rigidly bonded to the upper-layer prism sheet 28 and the liquid crystal panel 42 disposed on the light shielding sheet 32. According to the area light source device 10C according to one or more embodiments of the present invention, while the lower-layer light shielding sheet 32 does not adhere to the diffusion plate 26, the light shielding sheet 3 is pressed by the liquid crystal panel 42 through the prism sheet 28 and upper-layer light shielding sheet 48, which are disposed on the light shielding sheet 32, and the light shielding sheet 32 is securely fixed while sandwiched between the diffusion plate 26 and the upper-layer prism sheet 28. Accordingly, even if the end portion has a small dead space, the light shielding sheet is securely fixed to the diffusion plate to prevent the leakage of the light. As can be seen from the drawings, using the lower-layer light shielding sheet 32 and lower-layer prism sheet 27 having the substantially identical thickness, according to one or more embodiments of the present invention, the end portion of light shielding sheet 32 is securely fixed by the upper-layer prism sheet 28.

Third Embodiment

Figure 8:
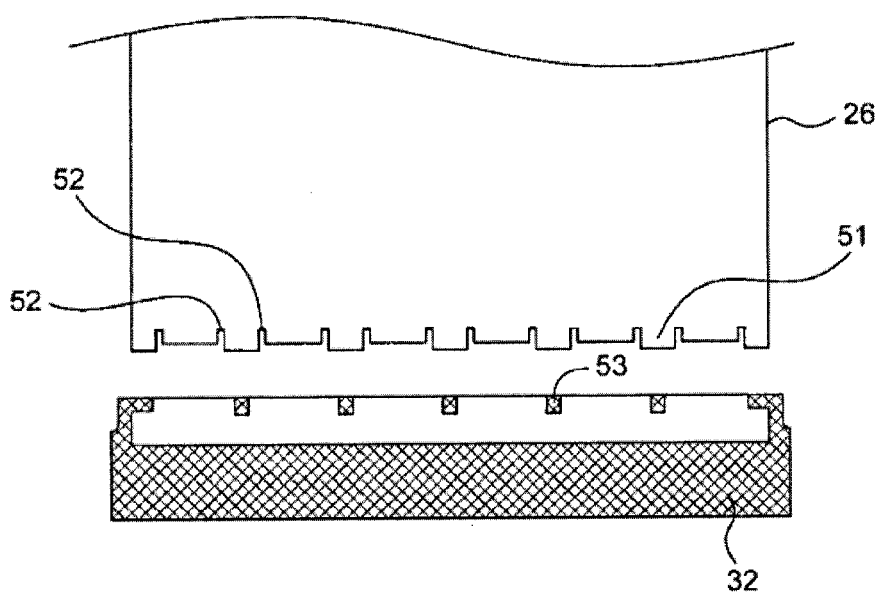
FIG. 8 is a plan view partially illustrating a light shielding sheet and a diffusion plate of the area light source device illustrated in FIG. 7.

A light guide plate in which a sectorial three-dimensional lens is formed in the inclined surface can be used as the light guide plate having the inclined surface. In the light guide plate provided with the three-dimensional lens, a conical sectorial surface is formed in a region of the inclined surface, and many radial grooves (radial prism structure) are formed in each sectorial surface. When the light guide plate in which the three-dimensional lens is formed is used, as illustrated in FIGS. 7 and 8, a projection 51 located between the adjacent radial prism structures 50 is formed in the end portion of the diffusion plate 26, an adhesive portion 53 is formed only in a region corresponding to the projection 51 in the corresponding end portion of the light shielding sheet 32, and the adhesive portion 53 of the light shielding sheet 32 may adhere rigidly to the projection 51. In such cases, according to one or more embodiments of the present invention, cuts 52 are formed on both sides of the projection 51 in order that the whole end portion of the diffusion plate 26 is prevented from being lifted by the light shielding sheet 32.

In the above description, the light emitting diode is used as the light source 23. Alternatively, a tubular light source may be used as the light source 23. In such cases, the light sources 23 are continuously disposed in the Z-direction of FIG. 1 along the end face 14.

In the above description, only the front surface 13 of the light guide plate 11 includes the inclined surface 20. Alternatively, the inclined surface may be formed in the rear surface 12 of the light guide plate 11.

Although the area light source device of according to one or more embodiments of the present invention is described above, one or more embodiments of the present invention includes a liquid crystal display device in which the liquid crystal panel is disposed on the area light source device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An area light source device comprising:
 a diffusion plate and a prism sheet stacked on a light guide plate; and
 a light source disposed opposite an end face of the light guide plate,
 wherein light emitted from the light source is introduced to an inside of the light guide plate from the end face,
 wherein area light emission is obtained by outputting the light diffused in the light guide plate from the diffusion plate and the prism sheet through a front face disposed opposite the diffusion plate,
 wherein the light guide plate includes:
  a light guide section that includes the end face disposed opposite the light source;
  a light emitting section that is disposed opposite the diffusion plate; and
  a joining section that joins the light guide section and the light emitting section,
 wherein the front surface in the joining section includes an inclined surface that is gradually retreated toward a rear surface on an opposite side from the light guide section toward the light emitting section,
 wherein the front faces of the light guide section and the joining section are covered with a light shielding member,
 wherein the light shielding member is fixed to the diffusion plate without interposing the prism sheet therebetween,
 wherein the light shielding member and the inclined surface are arranged to allow air to be interposed therebetween,
 wherein a bonding preventing layer is formed in a portion of the light shielding member, the portion of the light shielding member being located opposite the inclined surface, and
 an air gap is disposed between the inclined surface and an entirety of the bonding preventing layer.

2. The area light source device according to claim 1, wherein
 a light shielding member fixed portion is formed in the diffusion plate by deviating an edge on the light source side of the prism sheet toward the opposite side of the light source from the edge on the light source side of the diffusion plate, and
 the light shielding member is fixed to the light shielding member fixed portion.

3. The area light source device according to claim 1, wherein a front surface of the light shielding member fixed to the diffusion plate and a front surface of the prism sheet are disposed substantially flush with each other.

4. The area light source device according to claim 1, wherein the light shielding member and the prism sheet are disposed so as not to overlap each other on the diffusion plate.

5. The area light source device according to claim 1, comprising a second prism sheet that is disposed on the prism sheet, wherein the second prism sheet is disposed on the light shielding member fixed to the diffusion plate.

6. The area light source device according to claim 1, wherein the light shielding member is fixed to the diffusion plate with a spacer interposed therebetween.

7. The area light source device according to claim 6, wherein the spacer is made of an elastic material.

8. The area light source device according to claim 1, wherein a whole portion of the light shielding member facing the light guide plate is bonded.

9. The area light source device according to claim 1, wherein part of a portion of the light shielding member facing the light guide plate is bonded.

10. The area light source device according to claim 9, wherein the diffusion plate includes a plurality of projections that are projected toward the light shielding member, and each projection is bonded to the light shielding member.

11. The area light source device according to claim 10, wherein the joining portion of the light guide plate has a sectorial inclined surface when viewed from the front surface side, and the sectorial inclined surface is disposed between the projections adjacent to each other.

12. The area light source device according to claim 10, wherein cuts are formed on both sides of each projection in the diffusion plate.

13. The area light source device according to claim 11, wherein cuts are formed on both sides of each projection in the diffusion plate.

14. A liquid crystal display device comprising the area light source device of claim 1.

15. A liquid crystal display device comprising the area light source device of claim 2.

16. A liquid crystal display device comprising the area light source device of claim 3.

17. A liquid crystal display device comprising the area light source device of claim 4.

18. A liquid crystal display device comprising the area light source device of claim 5.

\* \* \* \* \*